March 15, 1955

J. C. McCLELLAND 2,703,986

BALANCED VARIABLE-SPEED POWER UNIT

Filed June 23, 1951

INVENTOR.
JOHN C. McCLELLAND,
BY:
Harold B. Hood.
ATTORNEY.

United States Patent Office 2,703,986
Patented Mar. 15, 1955

2,703,986

BALANCED VARIABLE-SPEED POWER UNIT

John C. McClelland, Erdenheim, Pa., assignor to Reeves Pulley Company, Columbus, Ind., a corporation of Indiana Application June 23, 1951, Serial No. 233,183

4 Claims. (Cl. 74—230.17)

Devices generally of the character illustrated, for instance, in the patents to Paul B. Reeves Numbers 2,089,711, 2,224,369 and 2,235,333, all owned by the assignee of the invention to be described herein, are used to drive, at variable speeds, all sorts of mechanisms; and in most applications, such devices are thoroughly satisfactory in operation. In certain specific applications, however, including the driving of delicate grinding machines, a vibration and/or fluctuation in maintained output speed, minute in magnitude, yet sufficient to affect measurably the efficiency of the delicate driven mechanism, has been noted. This vibration or fluctuation has been sufficiently deleterious to render speed-varying devices of the character under consideration unacceptable in such applications; and therefore, for a long time, the art has unsuccessfully sought the reason for, and a means to overcome, that vibration or fluctuation.

I have discovered that the trouble is caused by ballooning and transaxial vibration of the body of the spring designated by the reference numeral 22, for instance, in the above-identified Patent Number 2,224,369. When the parts rotate at high velocity, centrifugal action upon the said spring which, of course, rotates with its pulley, produces such ballooning and transaxial vibration of the spring. While I believe that that vibration is transmitted, through the spring supporting parts to the shaft designated by the numeral 15 in the said Patent Number 2,224,369, and so to the driven machine, I am not presently able to state certainly that it is this vibration which deleteriously affects the operation of the driven machine. It will be apparent that, as the spring is radially expanded, it will be slightly contracted in an axial direction, thereby relaxing the force which it exerts against the disc designated by the reference numeral 19 in the said patent. Such relaxation of force may result in momentary slipping of the driving belt, or in a momentary change in the speed ratio of the transmission; and it may be that it is this effect which, being transmitted to the driven machine, destroys the efficiency of the driven machine.

It is the object of the present invention to improve the structure of variable speed power units, generally of the character indicated, in such fashion as to eliminate the condition which results in the above-described vibration and/or speed fluctuation. Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
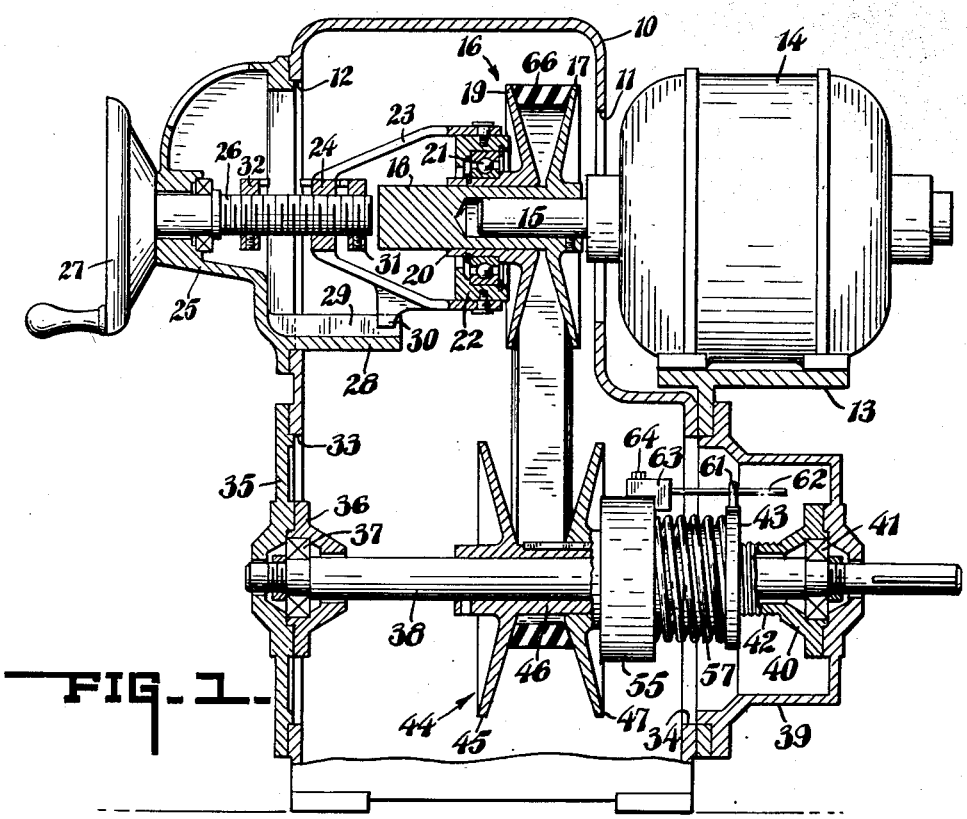
Fig. 1 is a vertical, sectional view through a speed-varying power unit of the character here under consideration, embodying my invention.

Referring more particularly to the drawings, it will be seen that I have indicated a conventional housing 10 formed, near its upper end, with a pair of substantially aligned openings 11 and 12. A platform 13 mounted adjacent the opening 11 supports an electric motor 14 in such a position that its spindle 15 projects through the opening 11 into the interior of the housing 10. An expansible V-pulley, indicated generally by the reference numeral 16, is supported upon said spindle 15 within the housing 10.

The pulley 16 comprises a coned disc 17 suitably fixed to the spindle 15 and, in the illustrated embodiment of the invention, having an elongated hub 18 projecting from its coned face. A mating coned disc 19, having a hub 20 projecting from its rear face, is supported upon the disc hub 18 for movement along the axis of the spindle 15 toward and away from its fellow 17. An antifriction thrust bearing 21 is axially fixed to the disc hub 20, and its outer race carries a shell 22 to which is operatively connected a yoke 23 terminating in a nut 24.

The opening 12 receives a closure 25 in which is journalled a screw shaft 26 carrying, outside the closure 25, a hand wheel 27; and the nut 24 is threadedly engaged on the screw shaft 26. As shown, the closure 25 is formed to provide a lug 28 defining a guideway 29 parallel with the axis of the spindle 15; and a finger 30 on the yoke 23 rides in said guideway 29 to hold the yoke 23 and nut 24 against rotation. The nut 24 is disposed between stop members 31 and 32 adjustably mounted on the screw shaft 26.

It will be apparent that rotation of the screw shaft 26 in one direction or the other will positively shift the disc 19 toward or away from the disc 17.

Near its lower end, the housing 10 is formed with a second pair of aligned openings 33 and 34. A closure plate 35 for the opening 33 carries, on its inner surface, a cap 36 in which is supported an antifriction bearing 37 providing a journal mounting for one end of a shaft 38 whose axis is substantially parallel with the axis of the spindle 15. A closure element 39 closes the opening 34 in the housing 10 and carries, on its inner surface, a spud 40 having an elongated, externally-threaded shank 42 upon which is threadedly and adjustably mounted an annular abutment element 43.

Within the housing, the shaft 38 supports an expansible V-pulley indicated generally by the reference numeral 44 and comprising a coned disc 45 fixed to said shaft and having, in the illustrated embodiment of the invention, an elongated hub 46 projecting from its coned face. A mating coned disc 47, having a rearwardly-projecting hub 48, is mounted on the hub 46 for movement along the axis of the shaft 38 toward and away from its fellow 45.

An antifriction thrust bearing, indicated generally by the reference numeral 49, comprises an inner race 51 fixed to the hub 48 between an outwardly-facing shoulder 50 on said hub and a spring ring 52 engaged in a suitable groove in the hub. A series of balls 53 retains the outer race 54 of the bearing 49 against axial movement relative to the inner race 51; and said outer race 54 is fixed against axial movement relative to a shell 55 by a spring ring 56 received in a suitable groove in said shell. Thus, the shell 55 is axially fixed to the hub 48 of disc 47, but is rotationally free with respect thereto.

Figure 2:
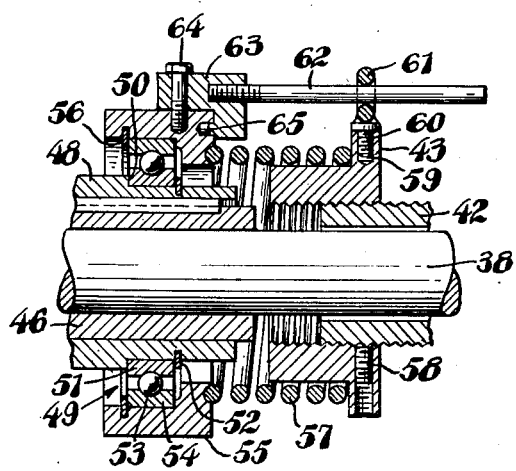
Fig. 2 is an enlarged vertical section through the spring, and the supports therefor, constituting a part of the resiliently-expansible pulley of the unit.
Figure 3:
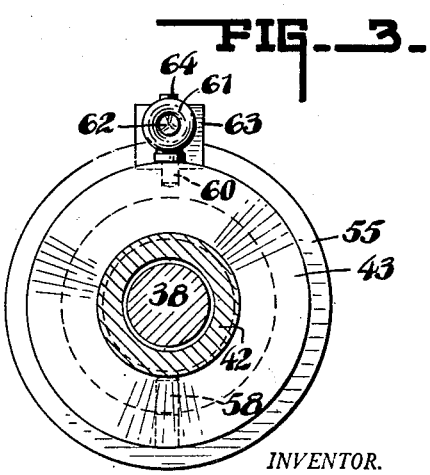
Fig. 3 is an end elevation of the spring assembly and associated parts, viewed from the right-hand end of Fig. 2.

A coiled spring 57 concentrically surrounds the shaft 38 and is confined between the abutment member 43 and the shell 55. As is most clearly shown in Fig. 2, said abutment member may be axially adjusted relative to the spud shank 42, and may be held in any selected position of adjustment by a set screw 58 carried by the abutment member 43 and engageable with the spud shank 42.

Means may preferably be provided for positively holding the shell 55 against any tendency to rotate with the disc hub 48; and, in the illustrated embodiment of the invention, the abutment member 43 is provided with a radially outwardly opening socket 59 receiving the threaded shank 60 of an eye 61 in which is slidably received a rod 62, one end of which is fixed to a block 63 suitably mounted upon the shell 55 as, for instance, by means of a machine screw 64 an a stud 65, respectively received in sockets formed in the shell 55.

In accordance with conventional practice, an edge-active belt 66 provides a driving connection between the pulleys 16 and 44. With the parts in their illustrated positions, the velocity of the shaft 38 will be a maximum. If, now, the hand wheel 27 is manipulated to turn the screw shaft 26 in a direction to move the nut 24 toward the left, the disc 19 will be moved away from the disc 17. Assuming the motor 14 to be energized to drive the assembly, such movement of the disc 19 will permit the spring 57 to shift the disc 47 toward the disc 45, crowding the belt 66 outwardly between said discs and drawing the belt inwardly between the discs 16 and 17. If such manipulation of the hand wheel 27 is continued until the nut 24 engages the stop 32, the belt 66 will be drawn deeply into the V between the discs 17 and 19 of the pulley 16, and will be crowded substantially to the outermost peripheries of the discs 45 and 47, whereby the velocity of the shaft 38 will be reduced below the velocity of the spindle 15.

Because the abutment member 43 and the shell 55 are held against rotation with the pulley 44, the spring 57 will not rotate, and consequently will not be subjected to the effect of centrifugal force. I have found that, when the stationary spring assembly of this disclosure is used, the vibration and/or speed fluctuation which occurs in the devices of the Paul B. Reeves patents above identified, does not arise. As a consequence, the speed-varying power unit of the present disclosure can be used to drive delicate grinding machines and the like with completely satisfactory results.

I claim as my invention:

1. In a device of the character described, a frame, a shaft journalled in said frame, an expansible V-pulley supported from said shaft and comprising a coned disc fixed with respect to said shaft and a mating coned disc shiftable along the axis of said shaft toward and away from its fellow, and means for resiliently urging said shiftable disc toward its fellow comprising a spud demountably supported from said frame and having a threaded shank concentrically surrounding a portion of said shaft, said shiftable disc being disposed between said fixed disc and said spud, abutment means threadedly mounted on said spud shank, abutment means carried by said last-named disc, and a coiled spring surrounding said shaft and confined between said abutment means.

2. In a device of the character described, a frame, a shaft, separate bearing means carried by said frame for journal mounting therein axially-spaced portions of said shaft, an expansible V-pulley supported from said shaft between said bearing means comprising a coned disc fixed with respect to said shaft and a mating coned disc shiftable along the axis of said shaft toward and away from its fellow, and non-rotatable means for resiliently urging said shiftable disc toward said fixed disc comprising a coiled spring sleeved on said shaft between said frame and said shiftable disc, a non-friction abutment means axially fixed but rotatable relative to said shiftable disc and concentrically surrounding said shaft, a spud having an elongated, threaded, hollow shank carried on said frame adjacent said shiftable disc, said shaft penetrating said hollow shank, an annular abutment means threadedly carried by said spud shank and threadedly shiftable toward and away from said first abutment means, said spring being confined between said abutment means, means for releasably holding said annular abutment means against rotation relative to said spud shank, and a member fixedly carried by one of said abutment means and axially slidably associated with the other of said abutment means to permit relative axial movement of said abutment means while holding the same against relative rotation.

3. In a device of the character described, a frame, a shaft, bearing means carried by said frame for journal mounting therein axially spaced portions of said shaft, an expansible V-pulley supported from said shaft between said bearing means comprising a coned disc fixed with respect to said shaft and a mating coned disc shiftable along the axis of said shaft toward and away from its fellow, and non-rotatable means for resiliently urging said shiftable disc toward said fixed disc comprising a coiled spring sleeved on said shaft between said frame and said shiftable disc, a spud having an elongated, threaded, hollow shank carried on said frame adjacent said shiftable disc, said shaft penetrating said hollow shank, a first annular abutment member threadedly carried by said spud shank and threadedly shiftable toward and away from said fixed disc, means for releasably holding said abutment member against rotation relative to said spud shank, a second annular abutment member surrounding said shaft between said first abutment member and said shiftable disc, an anti-friction bearing having an inner race fixed to said shiftable disc and an outer race fixed to said second abutment member, said spring being confined between said abutment members, and a rod substantially parallel to said shaft and having one end thereof fixed to one of said abutment members near the periphery thereof and the other end passing through an eye in the periphery of the other of said abutment members to permit opposite axial movement between said abutment members while preventing relative rotation therebetween.

4. The device of claim 1 in which the abutment means carried by said last-named disc includes an element movable with said disc, an element directly engaged by said spring, and anti-friction means interposed between said elements.

References Cited in the file of this patent

UNITED STATES PATENTS

| 2,164,818 | Heyer | July 4, 1939 |
| 2,202,554 | Heyer | May 28, 1940 |
| 2,277,004 | Reeves | Mar. 17, 1942 |
| 2,294,777 | Heyer | Sept. 1, 1942 |
| 2,531,992 | Schlaepfer | Nov. 28, 1950 |

FOREIGN PATENTS

| 254,055 | Switzerland | Dec. 1, 1948 |